(12) United States Patent
Nordman et al.

(10) Patent No.: US 9,253,823 B2
(45) Date of Patent: Feb. 2, 2016

(54) METAL MATRIX COMPOSITE USED AS A HEATING ELEMENT

(71) Applicant: The Boeing Company, Chicago, IL (US)

(72) Inventors: Paul S. Nordman, Renton, WA (US); Richard J. Loftis, Arlington, WA (US); Andy Armatorio, Everett, WA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 13/763,706

(22) Filed: Feb. 10, 2013

(65) Prior Publication Data
US 2014/0224782 A1 Aug. 14, 2014

(51) Int. Cl.
*B60L 1/02* (2006.01)
*H05B 3/22* (2006.01)
*B64D 15/12* (2006.01)
*B32B 9/00* (2006.01)
*B32B 9/04* (2006.01)
*B32B 15/18* (2006.01)
*B32B 15/20* (2006.01)
*B32B 27/38* (2006.01)
*B32B 3/30* (2006.01)

(52) U.S. Cl.
CPC .. *H05B 3/22* (2013.01); *B32B 3/30* (2013.01); *B32B 9/005* (2013.01); *B32B 9/041* (2013.01); *B32B 9/045* (2013.01); *B32B 15/18* (2013.01); *B32B 15/20* (2013.01); *B32B 27/38* (2013.01); *B64D 15/12* (2013.01); *B32B 2262/105* (2013.01); *B32B 2262/106* (2013.01); *B32B 2307/202* (2013.01); *B32B 2307/206* (2013.01); *B32B 2307/718* (2013.01); *B32B 2605/18* (2013.01); *H05B 2214/02* (2013.01); *Y10T 29/49826* (2015.01)

(58) Field of Classification Search
CPC ...... H05B 3/0014; B64D 15/00; B64D 15/12; B64D 15/14
See application file for complete search history.

(56) References Cited

U.S. PATENT DOCUMENTS 4,029,838 A 6/1977 Chamis et al.
4,411,380 A 10/1983 McWithey et al.
(Continued)

FOREIGN PATENT DOCUMENTS

GB 2253185 A 9/1992
WO WO2012/159608 A2 11/2012
WO WO2013/043251 A1 3/2013

OTHER PUBLICATIONS

Extended European Search Report EP13196535.2 and Written Opinion dated Mar. 14, 2014.
(Continued)

*Primary Examiner* — Shawntina Fuqua
(74) *Attorney, Agent, or Firm* — McDonnell Boehnen Hulbert & Berghoff LLP

(57) ABSTRACT

A structural substrate for an aircraft structure and methods are presented. A multi-layer hybrid composite material comprises an outermost layer, an intermediate layer, and an innermost layer. The outermost layer comprises an electrically conductive metal matrix composite that conducts electricity to provide electric heating. The intermediate layer comprises an electrical insulator coupled to the outermost layer. The innermost layer comprises a composite coupled to the intermediate layer. The intermediate layer electrically insulates the outermost layer from the innermost layer.

20 Claims, 6 Drawing Sheets

(56) References Cited

U.S. PATENT DOCUMENTS

| | | |
|---|---|---|
| 5,934,617 A | 8/1999 | Rutherford |
| 6,114,050 A | 9/2000 | Westre et al. |
| 6,338,455 B1 | 1/2002 | Rauch et al. |
| 6,852,273 B2 | 2/2005 | Ivanov et al. |
| 7,115,323 B2 | 10/2006 | Westre et al. |
| 7,368,176 B2 | 5/2008 | Wu et al. |
| 7,491,289 B2 | 2/2009 | Westre et al. |
| 7,763,833 B2 | 7/2010 | Hindel et al. |
| 7,875,333 B2 | 1/2011 | Stephan |
| 8,042,770 B2 | 10/2011 | Martin et al. |
| 2004/0245395 A1* | 12/2004 | Wallace .................. 244/134 R |
| 2005/0175813 A1 | 8/2005 | Wingert et al. |
| 2005/0271859 A1 | 12/2005 | Tuss et al. |
| 2007/0075188 A1 | 4/2007 | Stoner et al. |
| 2008/0149619 A1 | 6/2008 | Vontell |
| 2009/0107620 A1 | 4/2009 | Hasegawa et al. |
| 2010/0108661 A1 | 5/2010 | Vontell et al. |
| 2010/0133380 A1 | 6/2010 | Roebroeks et al. |
| 2011/0024409 A1 | 2/2011 | Shah et al. |
| 2012/0077017 A1 | 3/2012 | Buresch et al. |
| 2012/0186427 A1 | 7/2012 | Adams et al. |

OTHER PUBLICATIONS http://www.metpreg.com/, Accessed on Feb. 8, 2013.

* cited by examiner

METAL MATRIX COMPOSITE USED AS A HEATING ELEMENT

FIELD

Embodiments of the present disclosure relate generally to heating systems. More particularly, embodiments of the present disclosure relate to electric heating elements.

BACKGROUND

Airline's current deicing methods are resource intensive. Air carriers can be fined significantly per passenger by the U.S. Department of Transportation (DOT) if domestic departure delays exceed a certain number of hours. Average delay/cancellation costs may be significant per cancellation. Furthermore, snowstorms can cost air carriers millions of dollars a year as delays and cancellations can ripple across flight schedules stranding thousands of passengers in airport terminals.

Ethylene glycol antifreeze is currently used as Aircraft Deicing Fluid (ADF), however, the U.S. environmental protection agency (EPA) has classified glycol as a regulated industrial process (e.g., in wastewater) under NPDES 40 CFR Part 122. Seven billion gallons of aircraft deicing fluid storm water are generally generated per year (according to EPA 821-R-00-016), and capital costs of a glycol recovery system may be a significant cost per airport (according to EPA 832-F-99-043). Glycols can consume oxygen and can lead to non-optimal oxygen levels in aquatic systems, and corrosion inhibitors and surfactants present in deicing fluids may create a non-optimal environment for fish and other aquatic organisms. There is an ongoing industry wide effort to research alternate or complementary methods for deicing aircraft flight surfaces.

SUMMARY

A structural substrate for an aircraft structure and methods are presented. A multi-layer hybrid composite material comprises an outermost layer, an intermediate layer, and an innermost layer. The outermost layer comprises an electrically conductive metal matrix composite which conducts electricity to provide electric heating. The intermediate layer comprises an electrical insulator coupled to the outermost layer. The innermost layer comprises an innermost layer composite coupled to the intermediate layer. The intermediate layer electrically insulates the outermost layer from the innermost layer.

In this manner, embodiments of the disclosure provide a structural substrate that can be used in an ice protection system such as in-flight or ground ice protection system (GIPS) for deicing a vehicle such as an aircraft by warming surfaces of the vehicle. The ground ice protection system described herein reduces deicing time, deicing fluid, deicing resources, deicing cost, waste water generated, number of winter weather flight delays and cancellations and their effect on airline flight schedules, and aircraft non-optimality due to deicing. Additionally, the ground ice protection system can prevent ice buildup enhancing vehicle and safety of deicing-crew and substantially reduces a need for multi-truck deicing operations.

In an embodiment, a structural substrate for an aircraft structure comprises a multi-layer hybrid composite material comprising an outermost layer, an intermediate layer, and an innermost layer. The outermost layer comprises an electrically conductive metal matrix composite that conducts electricity to provide electric heating. The intermediate layer comprises an electrical insulator coupled to the outermost layer. The innermost layer comprises an innermost layer composite coupled to the intermediate layer. The intermediate layer electrically insulates the outermost layer from the innermost layer.

In another embodiment, a method for forming a structure comprising a multi-layer hybrid composite material configures an innermost layer comprising an innermost layer composite to form a structural component. The method further couples an intermediate layer comprising an electrical insulator to the innermost layer, and couples an outermost layer to the intermediate layer. The outermost layer comprises an electrically conductive metal matrix composite that conducts electricity to provide electric heating. The method further configures the intermediate layer to electrically insulate the outermost layer from the innermost layer.

In a further embodiment, a method for deicing using a structural substrate comprising a multi-layer hybrid composite material provides structural functionality via an innermost layer comprising an innermost layer composite. The method further electrically heats an outermost layer comprising an electrically conductive metal matrix composite by conducting electricity through the outermost layer. The method further electrically insulates the outermost layer from the innermost layer via an intermediate layer comprising an electrical insulator.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
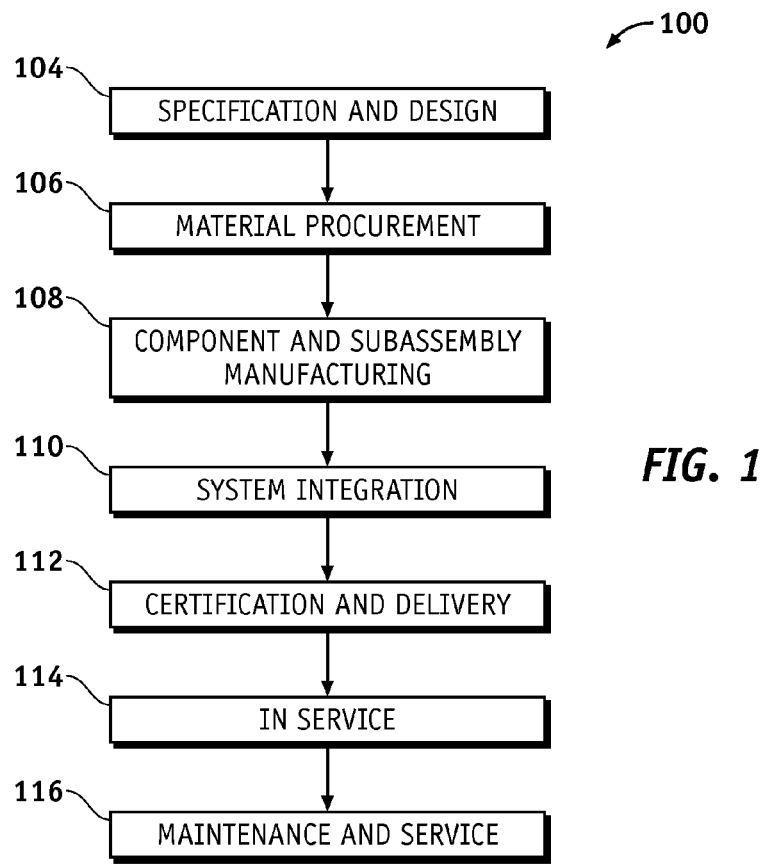
FIG. 1 is an illustration of a flow diagram of an exemplary aircraft production and service methodology.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to deicing systems, heat transfer, electromagnetic, electric heating, vehicle structures, substrate manufacturing, composite material, metal material, electrical insulators, and other functional aspects of the systems (and the individual operating components of the systems) may not be described in detail herein.

Embodiments of the disclosure are described in the context of a non-limiting application, namely, an aircraft surface. Embodiments of the disclosure, however, are not limited to such applications, and the techniques described herein may also be utilized in other vehicles requiring properties such as deicing, icing resistance, electromagnetic effect (EME) protection, structural strength and/or structural functionality. For example, embodiments may be applicable to ship deicing and/or EME protection.

For example, a superstructure on a ship can accumulate enough ice to capsize the ship as has occurred to Bering Sea fishing vessels. Removing ice by heavy impact can generate a structural anomaly in composite structures on newer ships. Ice removal can be non-optimal for labor and is a labor intensive process. An ice protection system technology as presented herein can prevent ice buildup enhancing ship and deicing-crew safety.

As would be apparent to one of ordinary skill in the art after reading this description, the following are examples and embodiments of the disclosure, and are not limited to operating in accordance with these examples. Other embodiments may be utilized and changes may be made without departing from the scope of the exemplary embodiments of the present disclosure.

Existing systems for deicing a vehicle add a separate heating layer to a composite stack up of the vehicle, which changes an outer mold line (OML) of the vehicle and increases weight of the vehicle. Heated parts of a vehicle using existing systems would need separate structural and heating layers. In the existing systems, a heated area must also protect against electromagnetic emission (EME) effects requiring addition of a separate conductive layer. This separate conductive layer in the existing systems would protect the underlying structure from lightning strikes. For an aircraft for example, since aircraft wings are large and an outer mold line of the aircraft is important, adding a separate heating layer and/or a separate EME layer to the structural layer such as the wing skin can be very non-optimal.

In contrast, embodiments of the disclosure use a metal matrix composite (MMC) that allows 1-2 layers to provide heating, structural support and EME protection that currently needs 3 layers. Embodiments provide combined layers of structural layer, heating layer and/or electromagnetic effect (EME) protection layer cured together to generate an integrated multi-layer substrate structure that can form a surface of a vehicle as a single piece or as a single structural component as compared to 2 to 3 separate pieces of the existing systems that are cured and used separately.

Thus, instead of needing for example 3 separate structural layers of material (forming separate structural components) to provide structural strength, heating and/or EME protection as in the existing systems, embodiments of the disclosure provide a structural substrate with the same structural strength and heating and/or EME protection by using 1 to 3 layers of material combined in a single structural component and not cured separately. This single structural substrate saves weight and increases a design trade space. A possible application of the structural substrate described herein is heating elements for the ground ice protection system and/or an in-flight ice protection system.

As explained in more detail below, embodiments use metal matrix composite material to act as an electric heater. In a composite stack up the metal matrix composite material can combine heating, structural strength and/or EME protection into a combined layer. As mentioned above, the combined layer is an improvement over the current methods of using separate structural, heating and/or EME protection layers. The combined layer then allows forming a single structural component such as a structural substrate for heating surfaces of a vehicle as explained in more detail below.

A metal matrix composite material can carry current to provide electric heating and/or EME protection while also providing structural strength to composite parts of a vehicle. This combination of functions into a combined layer can be accomplished without changing an outer mold line of the vehicle or adding weight to the vehicle for most parts. For an aircraft, this increases the design trade space.

Figure 2:
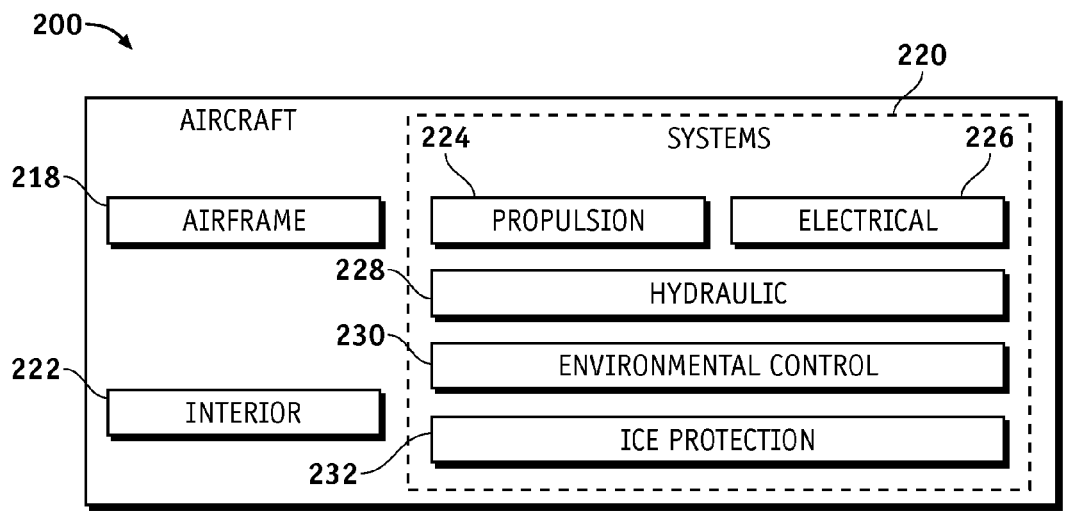
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental control system 230, and an ice protection system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
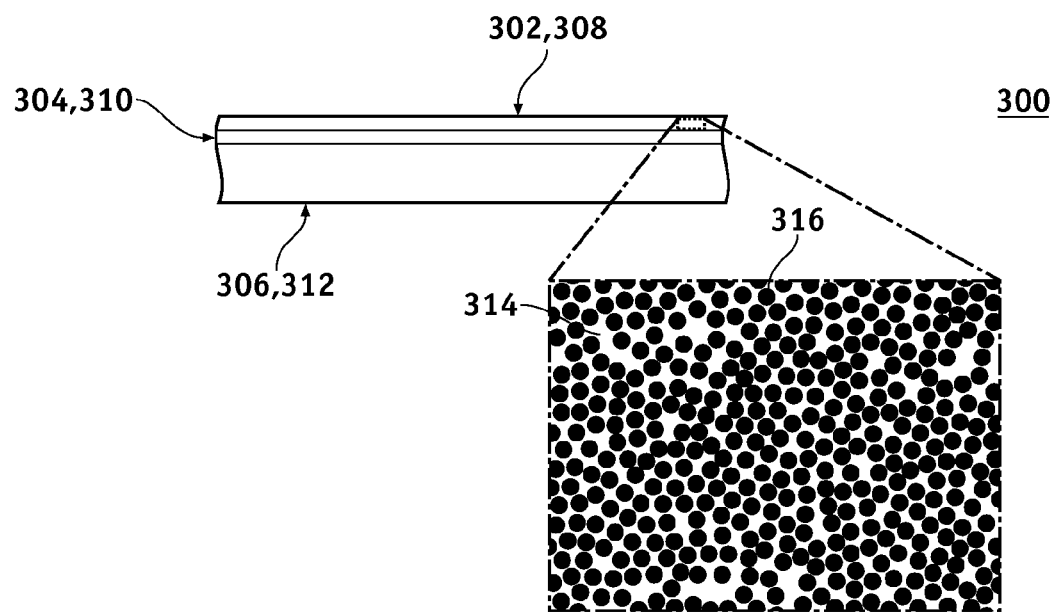
FIG. 3 is an illustration of an exemplary schematic structural substrate according to an embodiment of the disclosure.

FIG. 3 is an illustration of an exemplary schematic of a structural substrate 300 according to an embodiment of the disclosure. The structural substrate 300 comprises a multilayer hybrid composite material comprising an outermost layer 302, an intermediate layer 304, and an innermost layer 306 combined into a combined layer comprising a single structure.

The outermost layer 302 of the structural substrate 300 comprises an electrically conductive metal matrix composite 308 configured to conduct electricity to provide electric heating. The outermost layer 302 may provide the electric heating by, for example but without limitation, resistive heating, Joule heating, ohmic heating, bimetal electric heating, or other electric heating method. In the outermost layer 302, the electrically conductive metal matrix composite 308 provides heating, structural strength and/or EME protection into a combined layer. As explained above, this is an improvement over the existing systems which use separate parts or components for structure, heating and/or EME protection layers.

The electrically conductive metal matrix composite 308 can carry current to provide electric heating (e.g., ohmic (resistive) heating) and/or EME protection while also providing structural strength to composite parts of the vehicle. The structural substrate 300 is designed into, for example, a wing 502 (FIG. 5), and cured with the rest of the wing 502. Thus, this combination of functions into the combined layer can be accomplished without changing an outer mold line or adding weight.

This combined layer feature provides the single structure that increases the design trade space. For example, one or more plys can be removed from the wing 502 (FIG. 5) skin and replaced by electrically conductive metal matrix composite 308, which may save weight. For another example, the electrically conductive metal matrix composite 308 can be added to the wing 502 skin to add functionality but may change outer mold line in this example. The electrically conductive metal matrix composite 308 is configured as part of the wing.

The outermost layer 302 comprises a high strength high stiffness material that may comprise metal material 314 reinforced with fibers such as continuous ceramic fibers 316. The metal material 314 may comprise, for example but without limitation, metal aluminum alloys, titanium alloys, steel alloys, ceramic, silicon carbide, fiberglass, magnesium alloys, and/or other electrically conductive metal. In this manner, an ideal structural substrate such as the structural substrate 300 may be produced by selecting a suitable metal based on, for example but without limitation, sufficient electrical conductivity to dissipate lighting strike, sufficient resistivity to create needed heat, bimetal types to create sufficient heat, or other properties.

The outermost layer 302 may comprise riblets 510 (FIG. 5) configured to reduce aerodynamic drag on an outer surface such as the wing 502 as explained in more detail below.

The intermediate layer 304 comprises an electrical insulator 310 and is coupled to the outermost layer 302. The intermediate layer 304 is configured to electrically insulate the outermost layer 302 from the innermost layer 306. The electrical insulator 310 of the intermediate layer 304 may comprise, for example but without limitation, fiberglass, fiberglass reinforced polymer, ceramic, boron, silicon carbide, and or other electrical insulator.

The innermost layer 306 comprises a composite 312 coupled to the intermediate layer 304. The innermost layer 306 may comprise carbon-fiber-reinforced polymer, which may comprise epoxy or epoxy with hardener, and may be configured comprising unidirectional tape, and/or fabric and/or other composite.

The outermost layer 302 and the intermediate layer 304 form a hybrid laminate that adds structural strength to the wing 502 skin panel of the aircraft 500 which can provide a near neutral weight change to the structure of the aircraft 500.

In one embodiment, the outermost layer 302 comprising the electrically conductive metal matrix composite 308 may be laid directly on the innermost layer 306 comprising the composite 312 (structural composite) depending on a type of the electrically conductive metal matrix composite 308 used. In this configuration the intermediate layer 304 comprising the electrical insulator 310 may be omitted.

Figure 4:
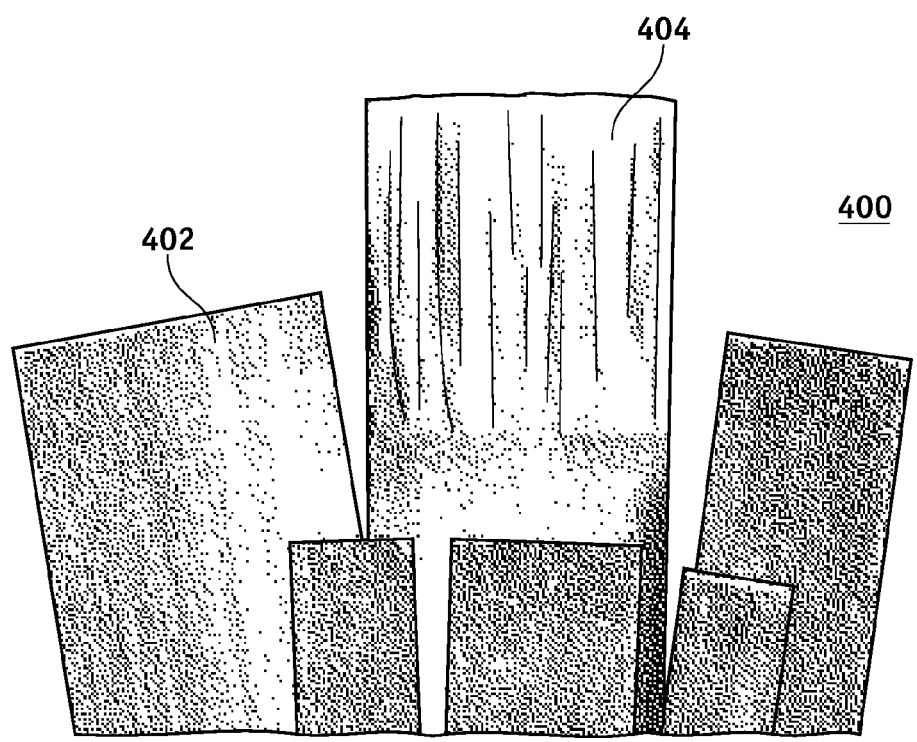
FIG. 4 is an illustration of an exemplary metal matrix composite material used in a structural substrate according to an embodiment of the disclosure.

FIG. 4 is an illustration of an exemplary metal matrix composite material 400 that may be used in the outermost layer 302 of the structural substrate 300 according to an embodiment of the disclosure. The metal matrix composite material 400 comprises metal matrix composite tape 402 that is configured to conduct electrical current to make resistive heaters that also provide structural strength. The metal matrix composite tape 402 can generate heat by passage of an electric current therethrough, or can generate heat by bimetal electric heating using two metals and passing electric current between the two metals.

Resistivity of the metal matrix composite tape 402 can be controlled to allow the heater and EME protection layer to be suitably combined. For example, the resistivity of the metal matrix composite tape 402 can be controlled by suitably choosing a type of metal used in the metal matrix composite tape 402. Unprocessed metal matrix composite tape 404 is also shown in FIG. 4.

Riblets 510 (FIG. 5) can be produced on the metal matrix composite tape 402 to reduce fluid dynamic drag on surfaces of a vehicle. Specifically, riblets 510 can be produced on the metal matrix composite tape 402 to reduce fluid dynamic drag on a surface such as the wing 502 of the aircraft 500 (FIG. 5) as explained below. Combining heater and/or EME layers such as the riblets 510 with a structural part such as a skin panel of the wing 502 can produce a near weight neutral system.

Figure 5:
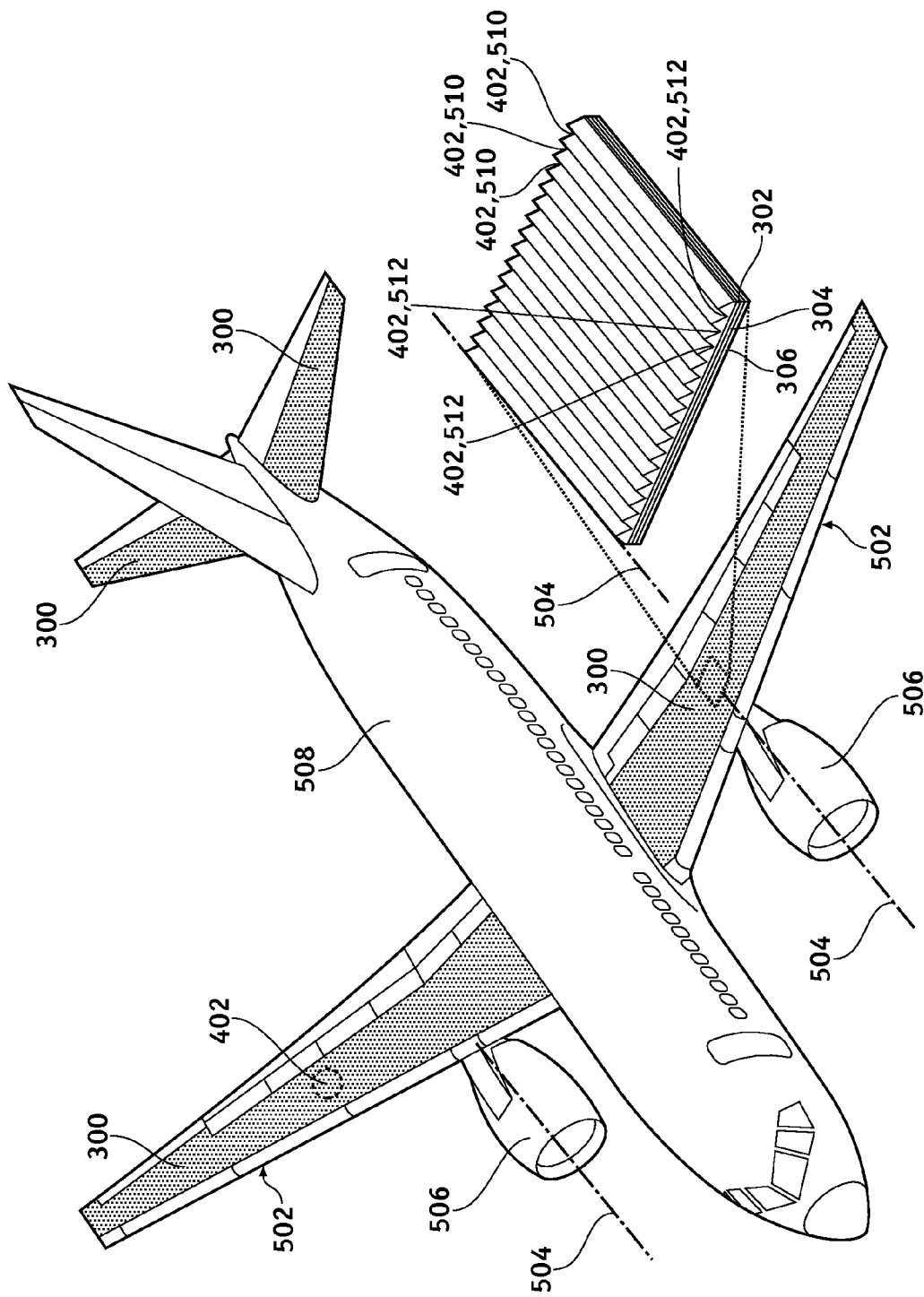
FIG. 5 is an illustration of an exemplary aircraft showing a structural substrate used as a heater on surfaces of an aircraft according to an embodiment of the disclosure.

FIG. 5 is an illustration of an exemplary aircraft 500 showing a structural substrate 300 used as a heater and as portions of surfaces of the aircraft 500 according to an embodiment of the disclosure. As discussed above, riblets 510 can be produced on the metal matrix composite tape 402 to reduce fluid dynamic drag on a surface such as the wing 502 of the aircraft 500. The riblets 510 may be oriented to be parallel with a side of a fuselage 508. Orientation of the riblets 510 on the wing 502, for example, varies based on speed and thus size of the wing 502. In one embodiment, the riblets 510 may be aligned with a center line 504 of an engine nacelle 506 to reduce fluid dynamic drag. The riblets 510 may comprise grooves 512.

The riblets 510 on the wing 502 reduce skin-friction drag from turbulent boundary-layer airflow. Thereby, the riblets 510 may save fuel and reduce emissions. The riblets 510 may constrain airflow and limit spanwise interaction, reducing drag. Furthermore, the riblets 510 may be used in conjunction with laminar flow to reduce skin-friction drag. Areas of the aircraft 500 where laminar flow may be difficult to sustain and a boundary layer may be turbulent can be covered by the riblets 510.

Figure 6:
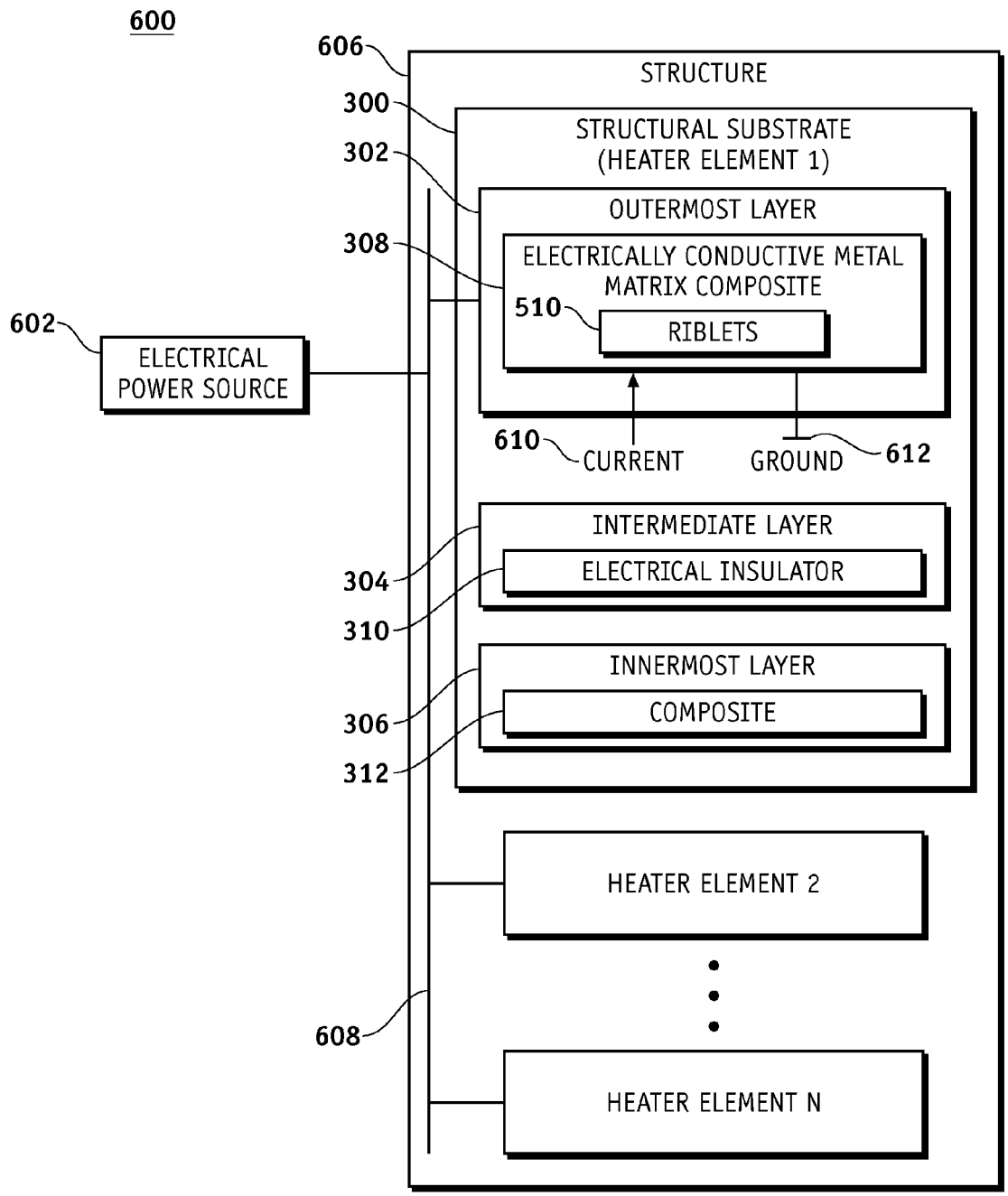
FIG. 6 is an illustration of an exemplary schematic block diagram showing an ice protection system using a structural substrate according to an embodiment of the disclosure.

FIG. 6 is an illustration of an exemplary schematic block diagram of an ice protection system 600 (system 600) according to an embodiment of the disclosure. System 600 comprises an electrical power source 602, a structure 606, and at least one structural substrate 300. System 600 may have functions, material, and structures that are similar to the embodiments shown in FIGS. 1-5. Therefore common features, functions, and elements may not be redundantly described here.

The structural substrate 300 is explained in the context of discussion of FIG. 3 above. The structural substrate 300 is configured to act as a heater element for electrically heating the structure 606. Any number of heater elements such as a heater element 1 to a heater element N (where N is an integer) may be used for heating the structure 606. Heater elements 1-N and structural substrate 300 may be used in this document interchangeably.

The electrical power source 602 may be a ground power supply comprising industry standard ground power cables (160 kVA), or other power cables suitable for heating various surfaces of the structure 606. System 600 may employ a wiring scheme operable for rapid power cycling to heat each of the heater elements 1-N on each section of the structure 606 individually maintaining a desired melt temp. For example, a heater grid may be divided into 20 sections to deice the wing 502. The wiring scheme may comprise, for example but without limitation, capacitors, inductors, and/or other wiring scheme. The electrical power source 602 may also comprise an in-flight generator with adequate electrical power using in-flight power cables suitable for heating various surfaces of the structure 606 in-flight.

The structure 606 may comprise a lifting surface, a control surface, or other surface. The lifting surface may comprise for example but without limitation, a wing, a fuselage and/or other lifting surface, the control surface may comprise for example but without limitation, a horizontal stabilizer, a vertical stabilizer, a spoiler, an aileron, an elevon, an elevator, a flap, and/or other control surface.

The structural substrate 300 may be integrated/designed in to the structure 606 such as the wing 502 of the aircraft 500. An electrical current 610 can be applied through the electrically conductive metal matrix composite 308 to enable deicing and preclude icing of, for example, the wing 502. The electrically conductive metal matrix composite 308 is configured as part of a surface of the wing 502 and may be grounded to an electric ground 612 to provide electromagnetic effect protection in the electrically conductive metal matrix composite 308. In this manner, the electrically conductive metal matrix composite 308 is grounded to the rest of the aircraft 500.

The outermost layer 302 may comprise the riblets 510 to reduce fluid dynamic drag on an outer surface of the structure 606 such as an outer surface of the wing 502.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 600 may comprise any number of processor modules, any number of processing modules, any number of memory modules, any number of electrical power sources, any number of control switches, and any number of buses suitable for their operation described herein. The illustrated system 600 depicts a simple embodiment for ease of description. These and other elements of the system 600 are interconnected together, allowing communication between the various elements of system 600. In one embodiment, these and other elements of the system 600 may be interconnected together via a bus 608.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 7:
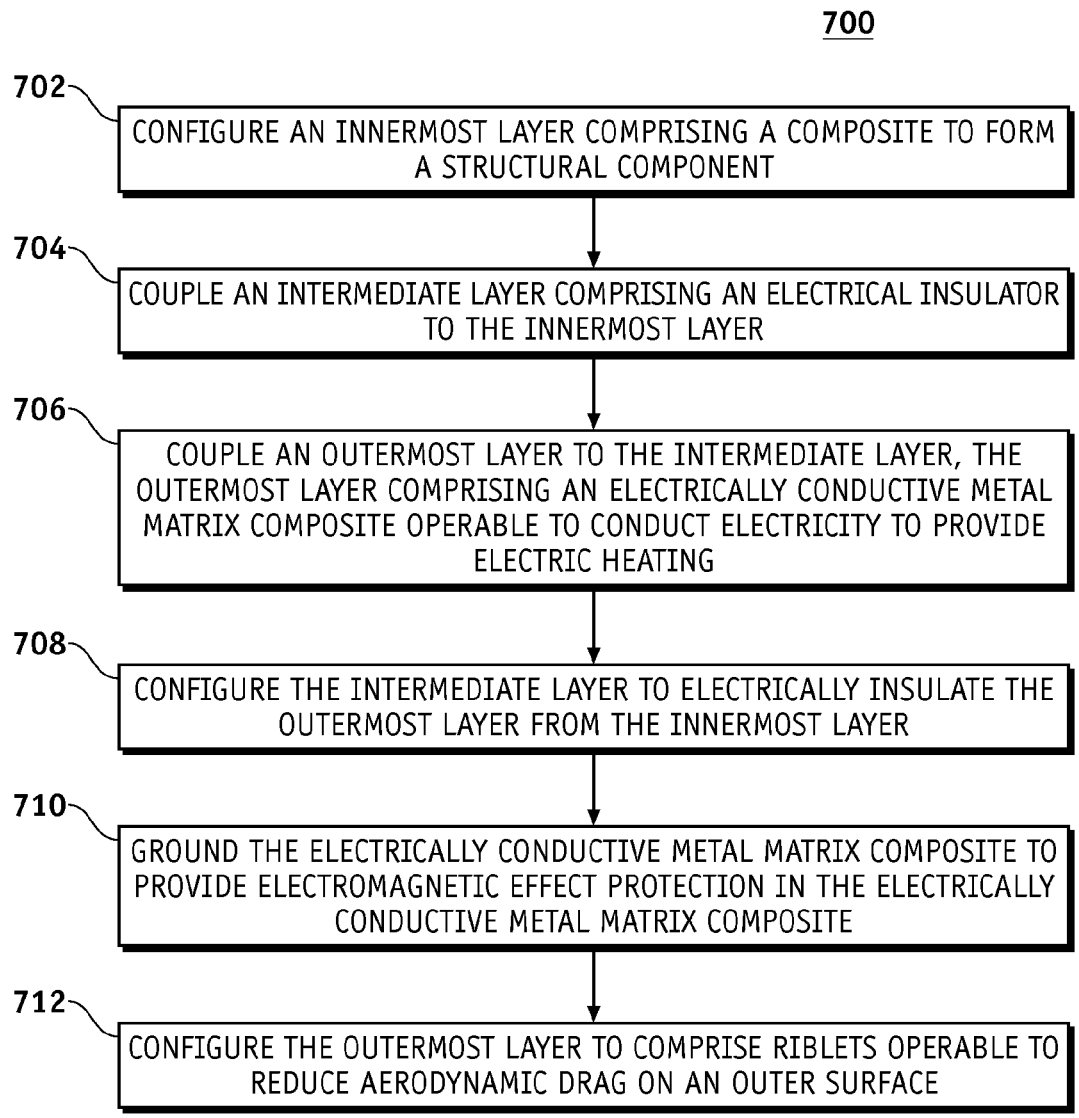
FIG. 7 is an illustration of an exemplary flowchart showing a process for configuring an ice protection system comprising a structural substrate according to an embodiment of the disclosure.

FIG. 7 is an illustration of an exemplary flowchart showing a process 700 for configuring a ground ice protection system using the structural substrate 300 according to an embodiment of the disclosure. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as processor module in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In some embodiments, portions of the process 700 may be performed by different elements of the system 600 such as: the electrical power source 602, the structure 606, and the structural substrate 300, etc. Process 700 may have functions, material, and structures that are similar to the embodiments shown in FIGS. 1-6. Therefore common features, functions, and elements may not be redundantly described here.

Process 700 may begin by configuring an innermost layer such as the innermost layer 306 comprising a composite such as the composite 312 to form a structural component such as the structural substrate 300 (task 702).

Process 700 may continue by coupling an intermediate layer such as the intermediate layer 304 comprising an electrical insulator such as the electrical insulator 310 to the innermost layer 306 (task 704).

Process 700 may continue by coupling an outermost layer such as the outermost layer 302 to the intermediate layer 304, the outermost layer 302 comprising an electrically conductive metal matrix composite such as the electrically conductive metal matrix composite 308 operable to conduct electricity to provide electric heating (task 706).

For example, in some embodiments, the intermediate layer 304 and the innermost layer 306 are coupled together (e.g., via pressing together) and then the outermost layer 302 is coupled to the intermediate layer 304 (e.g., via pressing together). In some embodiments, the outermost layer 302 and the intermediate layer 304 are coupled together (e.g., via pressing together) and then the innermost layer 306 is coupled (e.g., via pressing together) to the intermediate layer 304. In some embodiments, the outermost layer 302 and the intermediate layer 304 coupled and the innermost layer 306 are coupled together substantially simultaneously (e.g., via pressing together). Subsequently, curing of the coupled outermost layer 302, intermediate layer 304 and innermost layer 306 results in a bonding or fusing into a single combined layer. Coupling the intermediate layer 304 to the innermost layer 306, and coupling the outermost layer 302 to the intermediate layer 304 may be via, for example but without limitation, pressing, bonding, adhering, gluing, welding, fusing (e.g., mechanically), a combination thereof, or other suitable coupling.

In this manner, the outermost layer 302, the intermediate layer 304, and the innermost layer 306 are coupled and cured together to form a single integrated multi-layer structural component such as the structural substrate 300 that provides combined layers of structural layer, heating layer and/or electromagnetic effect (EME) protection layer that can form a surface of a vehicle such as the wing 502 as a single piece or as a single structural component as compared to 2 to 3 separate pieces of the existing systems that are cured and used separately.

Process 700 may continue by configuring the intermediate layer 304 to electrically insulate the outermost layer 302 from the innermost layer 306 (task 708).

Process 700 may continue by grounding the electrically conductive metal matrix composite 308 to provide electromagnetic effect protection in the electrically conductive metal matrix composite 308 (task 710).

Process 700 may continue by configuring the outermost layer 302 to comprise riblets such as the riblets 510 operable to reduce aerodynamic drag on an outer surface such as the wing 502 (task 712).

Figure 8:
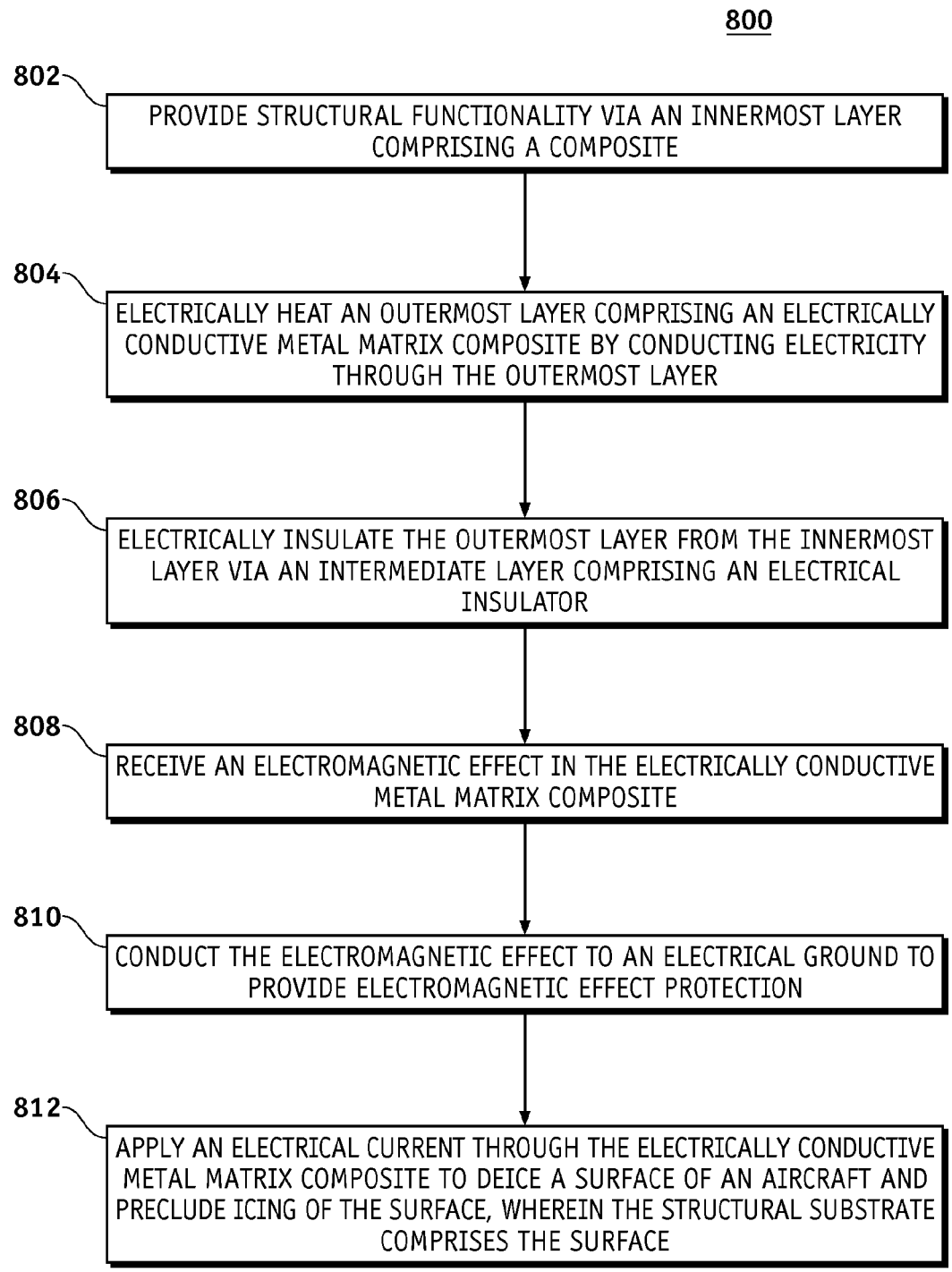
FIG. 8 is an illustration of an exemplary flowchart showing a process for operating an ice protection system according to an embodiment of the disclosure.

FIG. 8 is an illustration of an exemplary flowchart showing a process 800 for operating a ground ice protection system according to an embodiment of the disclosure. The various tasks performed in connection with the process 800 may be performed by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU such as a processor module in which the computer-readable medium is stored.

It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. In some embodiments, portions of the process 800 may be performed by different elements of the system 600 such as: the electrical power source 602, the structure 606, and the structural substrate 300, etc. Process 800 may have functions, material, and structures that are similar to the embodiments shown in FIGS. 1-6. Therefore common features, functions, and elements may not be redundantly described here.

Process 800 may begin by providing structural functionality via an innermost layer such as the innermost layer 306 comprising a composite such as the composite 312 (task 802). The structural functionality may comprise for example but without limitation, bending, support, and other function.

Process 800 may continue by electrically heating an outermost layer such as the outermost layer 302 comprising an electrically conductive metal matrix composite such as the electrically conductive metal matrix composite 308 by conducting electricity through the outermost layer 302 (task 804).

Process 800 may continue by electrically insulating the outermost layer 302 from the innermost layer 306 via an intermediate layer such as the intermediate layer 304 comprising an electrical insulator such as the electrical insulator 310 (task 806).

Process 800 may continue by receiving an electromagnetic effect in the electrically conductive metal matrix composite 308 (task 808).

Process 800 may continue by conducting the electromagnetic effect to an electrical ground such as the electric ground 612 to provide electromagnetic effect protection (task 810).

Process 800 may continue by apply an electrical current through the electrically conductive metal matrix composite 308 to deice a surface (such as the wing 502) of an aircraft and preclude icing of the surface, wherein the structural substrate 300 comprises the surface (wing 502) (task 812).

In this manner, embodiments of the disclosure provide electric heating elements that can be used in an ice protection system that deices a vehicle such as an aircraft by warming surfaces of the vehicle. The ice protection system when used on ground reduces: deicing time, deicing fluid, deicing resources, deicing cost, gallons of deicing fluid in storm water generated per year, number of winter weather flight delays and cancellations and their effect on airline flight schedules, and aircraft non-optimality due to deicing. Additionally, the ground ice protection system can prevent ice buildup enhancing vehicle and deicing crew safety and substantially reduces a need for multi-truck deicing operations.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Also, as used herein, unless expressly stated otherwise, "attached" means that one element/node/feature is directly mechanically joined, fused or force compressed by an application of heat and/or pressure "to another element/node/feature. Thus, although FIG. 1-6 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A structural substrate for an aircraft structure, comprising:
   a multi-layer hybrid composite material comprising:
   an outermost layer comprising an electrically conductive metal matrix composite operable to conduct electricity to provide electric heating;
   an intermediate layer comprising an electrical insulator coupled to the outermost layer; and
   an innermost layer comprising a second composite coupled to the intermediate layer, the intermediate layer operable to electrically insulate the outermost layer from the innermost layer.

2. The structural substrate of claim 1, wherein the electrically conductive metal matrix composite comprises: an aluminum alloy, a titanium alloy, a steel alloy, a magnesium alloy, or a combination thereof.

3. The structural substrate of claim 1, wherein the electrical insulator comprises a fiber comprising: fiberglass, fiberglass reinforced polymer, ceramic, boron, silicon carbide, or a combination thereof.

4. The structural substrate of claim 1, wherein the second composite comprises a carbon-fiber-reinforced polymer comprising epoxy or epoxy and toughener, and configured comprising: a fabric, a unidirectional tape, or a combination thereof.

5. The structural substrate of claim 1, wherein the structural substrate is located on a wing of an aircraft and an electrical current is applied through the electrically conductive metal matrix composite to enable deicing and preclude icing of the wing.

6. The structural substrate of claim 1, wherein the outermost layer comprises riblets operable to reduce aerodynamic drag on an outer surface.

7. The structural substrate of claim 1, wherein the electrically conductive metal matrix composite provides an electromagnetic effect protection for the aircraft.

8. The structural substrate of claim 1, wherein the electric heating comprises: resistive heating, bimetal heating, Joule heating, ohmic heating, or a combination thereof.

9. A method for forming a structural substrate comprising a multi-layer hybrid composite material, the method comprising:
   configuring an innermost layer comprising a first composite to form a structural component;
   coupling an intermediate layer comprising an electrical insulator to the innermost layer;
   coupling an outermost layer to the intermediate layer, the outermost layer comprising an electrically conductive metal matrix composite operable to conduct electricity to provide electric heating; and
   configuring the intermediate layer to electrically insulate the outermost layer from the innermost layer.

10. The method of claim 9, further comprising grounding the electrically conductive metal matrix composite to provide electromagnetic effect protection in the electrically conductive metal matrix composite.

11. The method of claim 9, further comprising configuring the outermost layer to comprise riblets operable to reduce fluid dynamic drag on an outer surface.

12. The method of claim 9, further comprising configuring the electrically conductive metal matrix composite to comprise: an aluminum alloy, a titanium alloy, a steel alloy, a magnesium alloy, or a combination thereof.

13. The method of claim 9, further comprising configuring the electrical insulator to comprise a fiber comprising: fiberglass, fiberglass reinforced polymer, ceramic, boron, silicon carbide, or a combination thereof.

14. The method of claim 9, further comprising configuring the first composite to comprise a carbon-fiber-reinforced polymer comprising epoxy or epoxy and toughener, and configured comprising: a fabric, a unidirectional tape, or a combination thereof.

15. The method of claim 9, further comprising configuring the electric heating to comprise: resistive heating, bimetal heating, Joule heating, ohmic heating, or a combination thereof.

16. The method of claim 9, further comprising locating the structural substrate on a wing of an aircraft and an electrical current is applied through the electrically conductive metal matrix composite to enable deicing and preclude icing of the wing.

17. A method for deicing using a structural substrate comprising a multi-layer hybrid composite material, the method comprising:
    providing structural functionality via an innermost layer comprising a first composite;
    electrically heating an outermost layer comprising an electrically conductive metal matrix composite by conducting electricity through the outermost layer; and
    electrically insulating the outermost layer from the innermost layer via an intermediate layer comprising an electrical insulator.

18. The method of claim 17, further comprising:
    receiving an electromagnetic effect in the electrically conductive metal matrix composite; and
    conducting the electromagnetic effect to an electrical ground to provide electromagnetic effect protection.

19. The method of claim 17, wherein the step of electrically heating further comprises: resistive heating, bimetal heating, Joule heating, ohmic heating, or a combination thereof.

20. The method of claim 17, further comprising applying an electrical current through the electrically conductive metal matrix composite to deice a surface of an aircraft and preclude icing of the surface, wherein the structural substrate comprises the surface.

\* \* \* \* \*